US010568402B2

(12) United States Patent
Kim

(10) Patent No.: US 10,568,402 B2
(45) Date of Patent: Feb. 25, 2020

(54) LUGGAGE WITH TRANSPORT PLATFORM

(71) Applicant: THECARRYONE CORP, New York, NY (US)

(72) Inventor: Soon Young Kim, New York, NY (US)

(73) Assignee: THECARRYONE CORP, New York, NY (US)

( * ) Notice: Subject to any disclaimer, the term of this patent is extended or adjusted under 35 U.S.C. 154(b) by 86 days.

(21) Appl. No.: 15/288,596

(22) Filed: Oct. 7, 2016

(65) Prior Publication Data

US 2018/0098609 A1 Apr. 12, 2018

(51) Int. Cl.

| | |
|---|---|
| ***B62B 3/02*** | (2006.01) |
| ***A45C 9/00*** | (2006.01) |
| ***A45C 5/14*** | (2006.01) |

(52) U.S. Cl.

CPC .................. *A45C 9/00* (2013.01); *A45C 5/14* (2013.01); *B62B 3/02* (2013.01); *B62B 2202/24* (2013.01)

(58) Field of Classification Search

CPC .. A45C 9/00; A45C 9/007; A45C 5/14; A45C 13/28; A45C 13/26; A47C 13/00; B65B 1/04; B60R 7/00

See application file for complete search history.

(56) References Cited

U.S. PATENT DOCUMENTS

| | | | | | |
|---|---|---|---|---|---|
| 327,749 | A * | 10/1885 | Wulff | A45C 5/00 | 190/10 |
| 3,827,707 | A * | 8/1974 | Bierman | B62B 1/125 | 280/47.24 |
| 4,792,025 | A * | 12/1988 | Thomas | A45C 5/14 | 190/100 |
| 5,323,886 | A * | 6/1994 | Chen | A45C 5/143 | 16/113.1 |
| 5,374,073 | A * | 12/1994 | Hung-Hsin | A45C 5/14 | 16/113.1 |
| 6,688,614 | B2 | 2/2004 | Hsu | | |
| 7,014,020 | B2 * | 3/2006 | Tamura | A45C 5/14 | 190/1 |
| 7,246,805 | B2 * | 7/2007 | Neal | A45C 5/14 | 280/35 |
| 8,182,030 | B1 * | 5/2012 | Britten | A47D 13/025 | 297/118 |
| 8,282,109 | B1 | 10/2012 | Arjomand et al. | | |
| 8,282,113 | B2 | 10/2012 | Veal et al. | | |
| 8,517,398 | B1 * | 8/2013 | Wilson | B62B 1/12 | 280/37 |
| 9,033,350 | B2 | 5/2015 | Porri | | |
| 9,090,274 | B1 | 7/2015 | Arjomand et al. | | |

(Continued)

FOREIGN PATENT DOCUMENTS

| | | |
|---|---|---|
| TW | M332406 U | 5/2008 |
| WO | 0059332 A1 | 10/2000 |

*Primary Examiner* — John D Walters
*Assistant Examiner* — James J Triggs
(74) *Attorney, Agent, or Firm* — St. Onge Steward Johnston & Reens, LLC

(57) ABSTRACT

A luggage transport system includes a first piece of luggage and a transport platform coupled to the first piece of luggage and adapted for supporting at least one additional piece of luggage when in a working position, wherein the transport platform has a first part and a second part pivotably connected to the first part, wherein the second part is substantially perpendicular to the first part when the transport platform is in the working position.

18 Claims, 14 Drawing Sheets

(56) References Cited

U.S. PATENT DOCUMENTS

| | | | | |
|---|---|---|---|---|
| 9,119,453 | B1 * | 9/2015 | LaRocque | A45C 13/001 |
| D742,638 | S * | 11/2015 | Melanson | D3/274 |
| 2004/0021353 | A1 | 2/2004 | Lozano et al. | |
| 2004/0094919 | A1 * | 5/2004 | Roder | A45C 5/14<br>280/30 |
| 2005/0156002 | A1 * | 7/2005 | Neal | A45C 5/14<br>224/485 |
| 2008/0217130 | A1 | 9/2008 | Louis | |
| 2009/0315301 | A1 | 12/2009 | Athalye | |
| 2011/0247910 | A1 | 10/2011 | Darvish et al. | |
| 2013/0001911 | A1 * | 1/2013 | Porri | A45C 5/146<br>280/87.042 |
| 2015/0208776 | A1 * | 7/2015 | Bennett | A45C 9/00<br>190/15.1 |

* cited by examiner

LUGGAGE WITH TRANSPORT PLATFORM

FIELD OF THE INVENTION

The invention relates to luggage transport systems and methods. In particular, the invention relates to a system for transporting two or more pieces of luggage together such that they can be easily maneuvered with one hand.

BACKGROUND OF THE INVENTION

Many travelers carry more than one suitcase or another piece of luggage through airports, trains, buses or hotels. Transporting more than one piece of luggage is often difficult, especially when the traveler has to use one of his or her hands to do other tasks, such as handle traveling tickets or hold a beverage cup. There are often transport carts available for transporting multiple pieces of luggage, but the carts typically require a fee, are bulky, and are not always practical to use. Additionally, airports, hotels and bus terminals often have multiple levels, requiring the traveler to transport luggage on an escalator, which further complicates handling of multiple pieces of luggage at the same time.

A number of prior art systems have been developed for transporting multiple pieces of luggage. However, while these known systems provide various ways of attaching pieces of luggage together for transport, they are often too cumbersome, heavy, difficult to assemble and/or expensive to manufacture, thus resulting in a higher cost for consumers.

SUMMARY OF THE INVENTION

Accordingly, it is an objective of the present invention to provide a luggage system that provides a simple and effective way of transporting multiple luggage pieces that is easy to assemble and operate.

It is further an objective of the present invention to provide a luggage system for transporting multiple pieces of luggage that can be moved easily with one hand.

In order to overcome the deficiencies of the prior art and to achieve at least some of the objects and advantages listed, the invention comprises a luggage transport system, including a first piece of luggage, and a transport platform coupled to the first piece of luggage, wherein the transport platform has a first part and a second part pivotably connected to the first part, wherein the second part is substantially perpendicular to the first part when the transport platform is in a working position.

In some embodiments, the first part of the transport platform is substantially perpendicular to an adjacent wall of the first piece of luggage when the transport platform is in the working position. In other embodiments, the first part and the second part and of the transport platform extend along the same vertical axis when in a non-working position.

In certain embodiments, the second part of the transport platform is substantially parallel to the first part when the transport platform is in a non-working position.

In some embodiments, the transport platform folds upward towards a wall of the first piece of luggage when in a non-working position and folds downward when in the working position. In certain of these embodiments, the transport platform folds to a front wall of the first piece of luggage. In additional embodiments, the transport platform folds to a rear wall of the first piece of luggage. In further embodiments, the transport platform folds to one of side-walls of the first piece of luggage.

In some cases, the transport platform slides under the first piece of luggage when in a non-working position and slide from under the first piece of luggage when in the working position.

In certain embodiments, the first part of the transport platform has a top wall and a bottom wall, and wherein the second part of the transport platform has a top wall and a bottom wall. In some of these embodiments, when the transport platform is in a non-working position, the bottom wall of the second part is facing a wall of the first piece of luggage and the top wall of the second part is facing the top wall of the first part. In additional embodiments, when the transport platform is in a non-working position, the top wall of the first part and the top wall of the second part face a wall of the first piece of luggage. In some of these embodiments, the system further includes two connecting members, wherein each of the two connecting members is connected to the first piece of luggage at one end and to the second part of the transport platform at the other end.

In some embodiments, the transport platform includes at least one wheel positioned on the bottom wall of the first part.

In additional embodiments, the transport platform includes at least one wheel movably positioned on the bottom wall of the first part, and wherein the transport platform further includes a channel positioned on the bottom wall of the first part that movably engages the wheel such that the wheel is positioned under the first piece of luggage when the transport platform is in a non-working position and is slid out and positioned under the transport platform when the platform is in the working position.

In further embodiments, the system further includes a pair of movable wheels coupled to a bottom wall of the first piece of luggage, wherein the pair of wheels are rotated and placed under the transport platform when the platform in in the working position.

In some embodiments, the first piece of luggage includes two or more wheels. In additional embodiments, the first piece of luggage has a handle for transporting the luggage system.

In certain embodiments, the transport platform is adapted for supporting at least one additional piece of luggage when in the working position, In further embodiments, a luggage system is provided that includes a first piece of luggage, a transport platform coupled to the first piece of luggage and comprising a first part and a second part, wherein the second part is substantially perpendicular to the first part, and at least one additional piece of luggage supported on the first part of the transport platform between the second part of the transport platform and the first piece of luggage.

Other objects of the invention and its particular features and advantages will become more apparent from consideration of the following drawings and accompanying detailed description.

BRIEF DESCRIPTION OF THE DRAWINGS

FIGS. 9A and 8B are side views of the luggage transport system of the present invention, with the transport platform attached to a rear wall of the luggage piece, showing the transport platform in different configurations.

DETAILED DESCRIPTION OF THE INVENTION

Figure 1A:
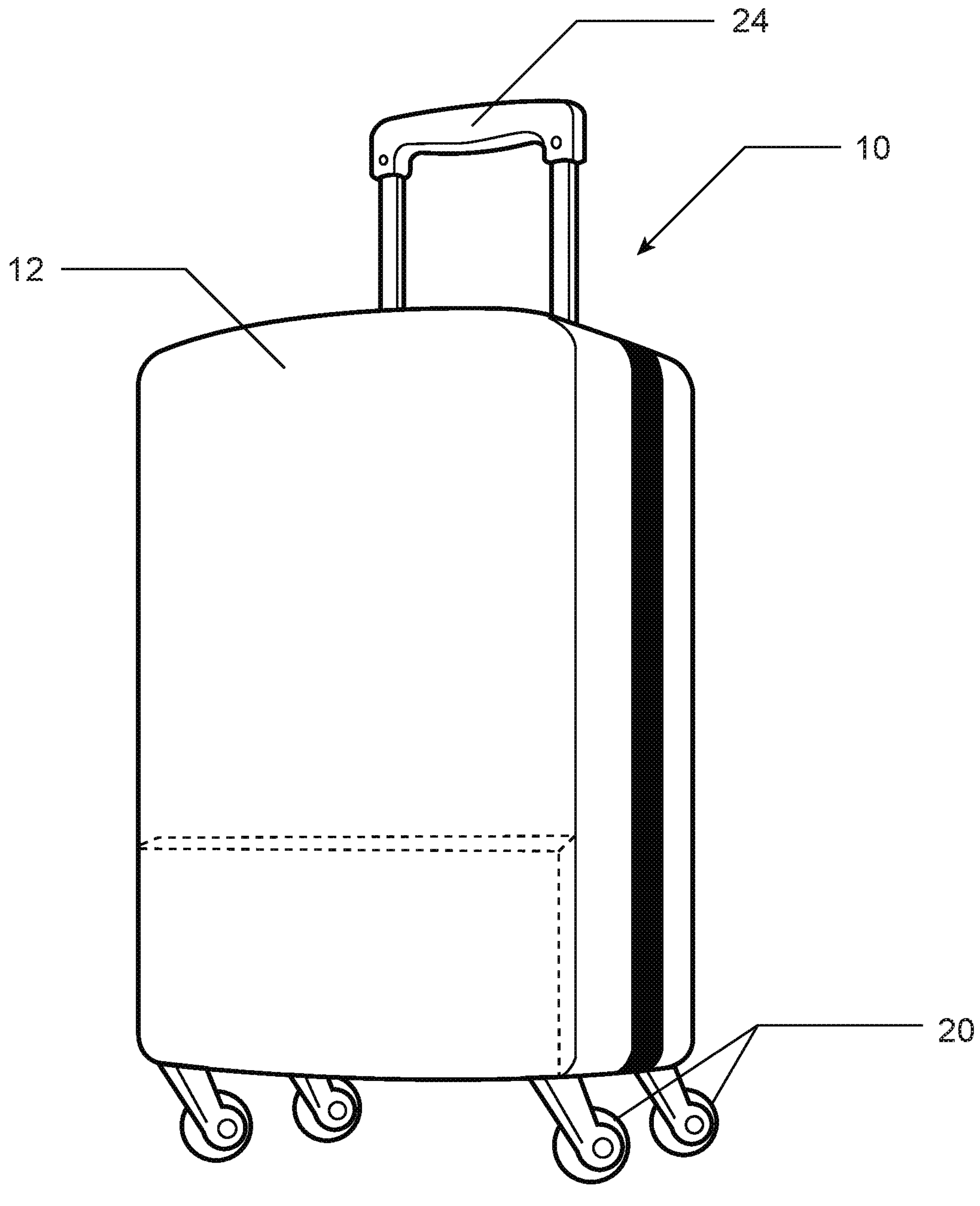
FIG. 1A is a front perspective view of the luggage transport system in accordance with the present invention.

The basic components of an exemplary embodiment of a luggage transport system in accordance with the invention are illustrated in FIG. 1A. As used in the description, the terms “top,” “bottom,” “above,” “below,” “over,” “under,” “above,” “beneath,” “on top,” “underneath,” “up,” “down,” “upper,” “lower,” “front,” “rear,” “back,” “forward” and “backward” refer to the objects referenced when in the orientation illustrated in the drawings, which orientation is not necessary for achieving the objects of the invention.

The luggage transport system of the present invention is designed for convenient and simple way of transporting multiple pieces of luggage such that they can be moved easily with one hand. This is achieved by providing a transport platform that is attached to a first piece of luggage that supports one or more additional pieces of luggage. Travelers usually have to transport suitcases with them around the airport for a while before boarding a plane, and they often have other luggage piece, e.g. laptop case, purse, etc., with them. The system of the present invention allows travelers to conveniently transport all pieces of luggage together as one unit, and at the same time, easily folds down to a compact luggage to be stoved in an airplane overhead compartment.

As illustrated in FIG. 1A, the luggage transport system 10 includes a first piece of luggage 12. The luggage piece 12 can be of any shape and/or size. In some embodiments, the luggage piece 12 has one or more sets of wheels 20 to facilitate transport of the luggage by the user by rolling it on the ground surface. In additional embodiment, the luggage piece 12 also includes a handle 24 that the user can grab to transport the luggage.

Figure 1B:
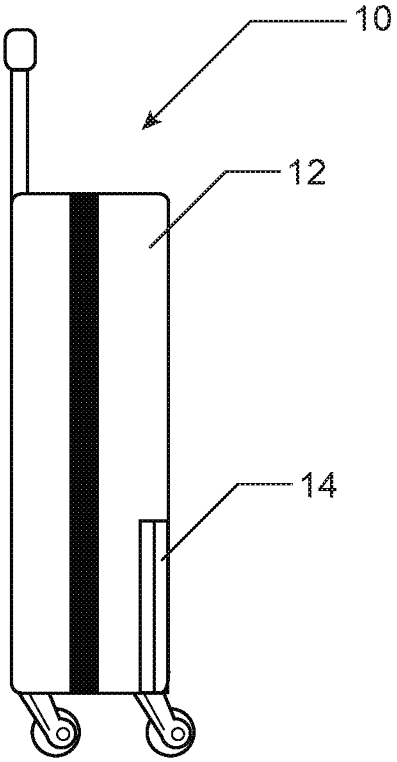
FIG. 1B is a side view of the luggage transport system of FIG. 1A, showing a transport platform in a non-working configuration.
Figure 1C:
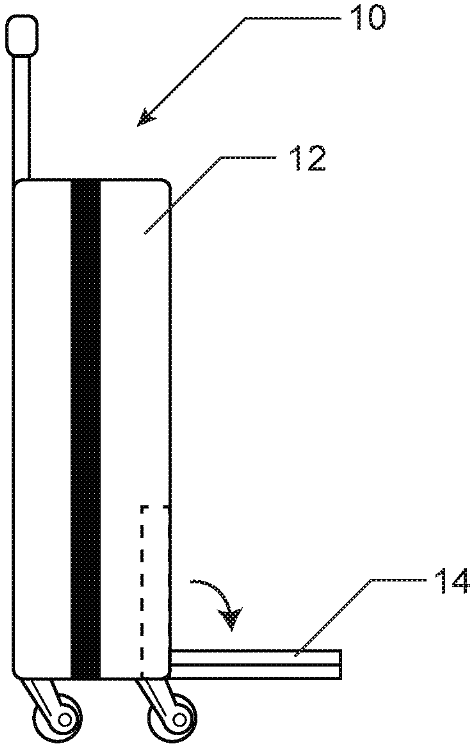
FIG. 1C is a side view of the luggage transport system of FIG. 1A, showing the transport platform being moved to a working configuration.
Figure 1D:
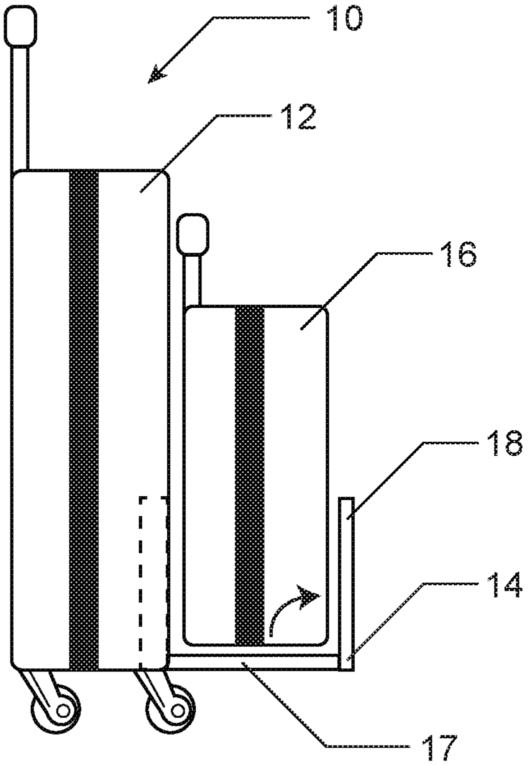
FIG. 1D is a side view of the luggage transport system of FIG. 1A, showing the transport platform in the working configuration supporting a second piece of luggage.

The luggage transport system 10 also includes a transport platform 14 attached to the luggage piece 12, as shown in FIGS. 1B-1D. In this embodiment, the transport platform 14 is attached to the luggage 12 by any suitable connecting mechanism that allows for pivoting movement of the platform with respect to the luggage wall, such that the platform can be folded upward and unfolded down, as described in more detail below. In some embodiments, the transport platform is permanently attached to the luggage piece 12. In other embodiments, the platform 14 can be removed from the luggage 12 when desired such that the luggage 12 can be used as a regular suitcase. The platform can be attached directly to the wall of the luggage piece 12 by any suitable means, such as, e.g., sewing, gluing, screwing, or welding.

Alternatively, the luggage 12 may be provided with an external frame, which may be fixedly or removably attached to the luggage, and the platform 14 is attached to the frame. The transport platform 14 is made with any suitable material, such as metal or plastic, that is lightweight but is durable enough to support additional pieces of luggage on the platform.

When the transport platform 14 is in a non-working position, it is folded upward such that it is positioned substantially parallel to the wall of the luggage piece 12, as shown in FIG. 1B. When it is desirable to use the transport platform 14, it is unfolded downward, as shown in FIG. 10, such that the platform 14 is substantially perpendicular to the wall of the luggage piece 12. The platform 14 has a first portion 17 and a second portion 18, which are pivotally connected to each other by any suitable connector that allows for pivoting motion. Once the platform is unfolded perpendicular to the luggage wall, the second portion 18 is unfolded further such that it extends substantially perpendicular to the first portion 17 and substantially parallel to the luggage wall, as illustrated in FIG. 1D. Then, one or more additional pieces of luggage 16 can be placed on the first portion 17 of the platform 14, and the second portion 18 functions to secure the luggage 16 on the platform such that it does not slide off the platform. The transport platform 14 may be provided with additional means for securing the luggage 16 on the platform, such as, e.g., belts, panels made with mesh or other material, straps, a cover, or other fasteners that extend around the luggage 16, as described in more detail below.

It is noted that, while FIGS. 1A-1D show the transport platform 14 being attached to the front wall of the luggage piece 12, it can also be attached to the back wall or either side wall of the luggage piece, as described in more detail below. It is also understood that the platform 14 may have only one portion 17 that supports the additional pieces of luggage, without the second portion 18. It is further noted that the transport platform 14 may have one or more wheels permanently or removably attached to its bottom, as further described below.

In some embodiments, as shown in FIGS. 12A-12D, the transport platform 14 includes a third portion 80 and a fourth portion 82, in addition to the first portion 17 and the second portion 18. The third and fourth portions 80, 82 are pivotably connected to the first portion 17 such that they can be unfolded upward away from the first portion similarly to the second portion 18. The third and fourth portions are connected to the first portion by any suitable pivotable connector, as described above. When the platform 14 is in the non-working configuration shown in FIG. 12A, the third and fourth portions 80, 82 are folded inwards such that they are placed adjacent to and substantially parallel to the first portion 17, and the second portion 18 is then folded inwards such that it is placed adjacent to and substantially parallel to the third and fourth portions. The entire platform 14 is then folded up to the wall of the luggage 12.

Figures 12A, 12B, 12C, 12D:
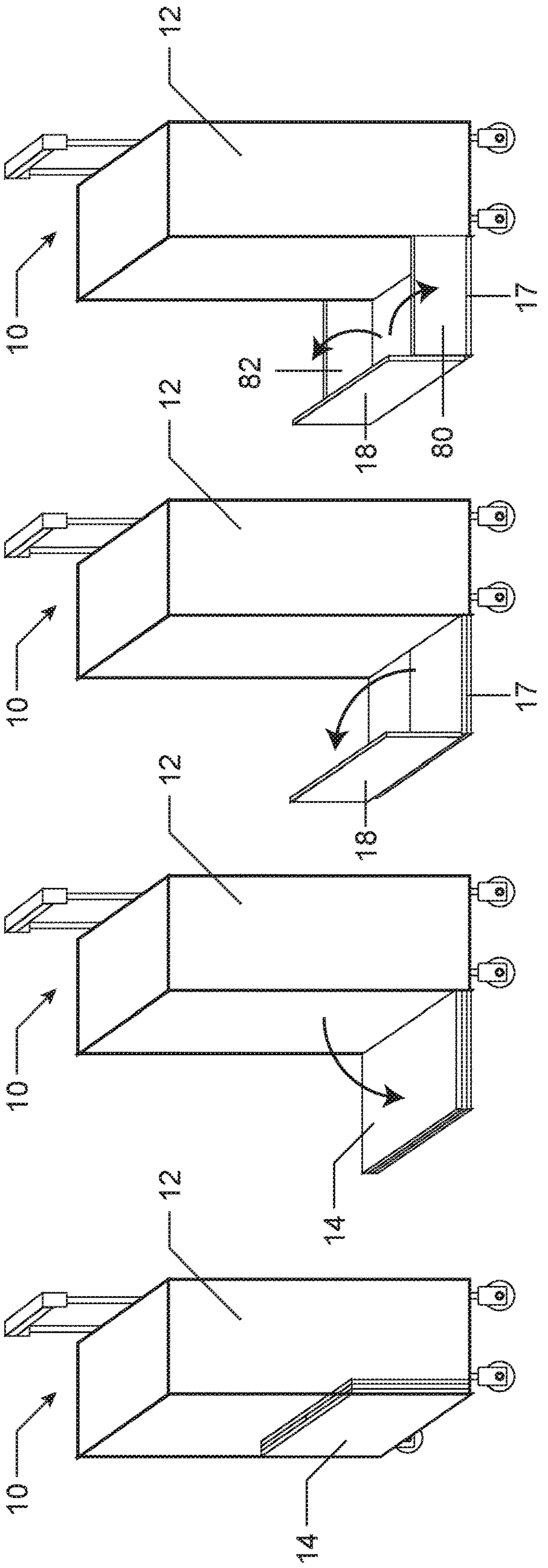
FIGS. 12A-12D are side perspective views of the luggage transport system, showing a four-part transport platform in various configurations.

When in use, the first portion 17 is pivoted down, as seen in FIG. 12B until it is substantially parallel to the ground. Then, the second portion 18 is unfolded as illustrated in FIG. 12C until it is substantially perpendicular to the first portion 17. Next, the third and fourth portions 80, 82 are unfolded until they are also substantially perpendicular to the first portion 17, as shown in FIG. 12D. Thus, in its final working configuration, the transport platform 14 has panels 18, 80 and 82 that extend on three sides of the platform. Such design ensures that additional luggage 16 is secured on the platform such that it will not slide off the platform.

It is understood that other configurations of the platform side panels are also envisioned. For example, the platform may have only the third and fourth portions without the second portion, or only one of the third and fourth portions.

Figure 2A:
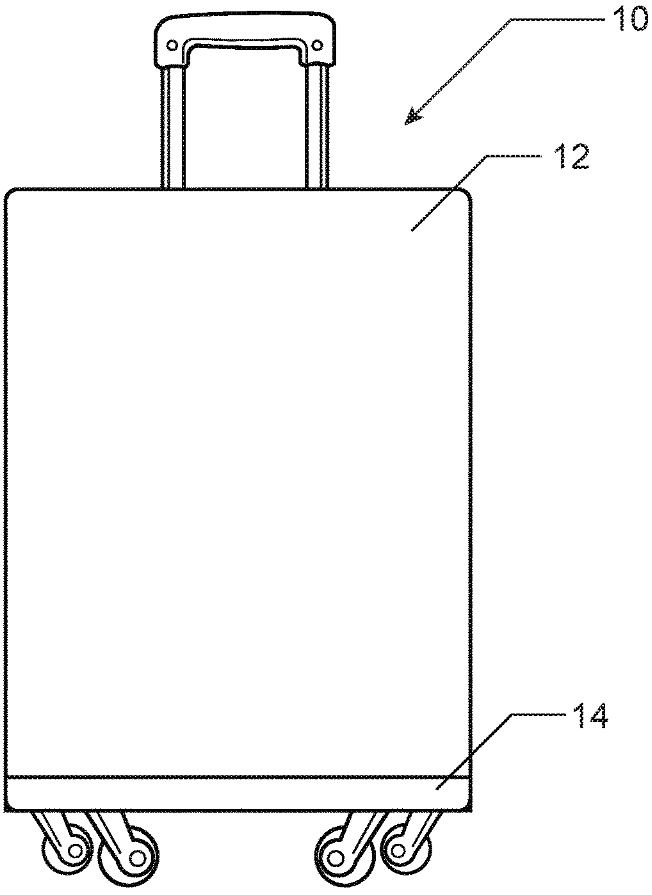
FIG. 2A is a front view of another embodiment of the luggage transport system in accordance with the present invention.
Figure 2B:
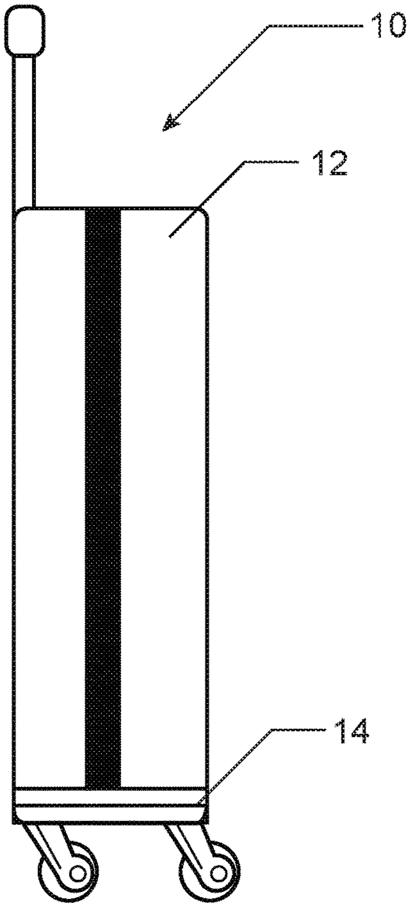
FIG. 2B is a side view of the luggage transport system of FIG. 2A, showing a transport platform in a non-working configuration.
Figure 2C:
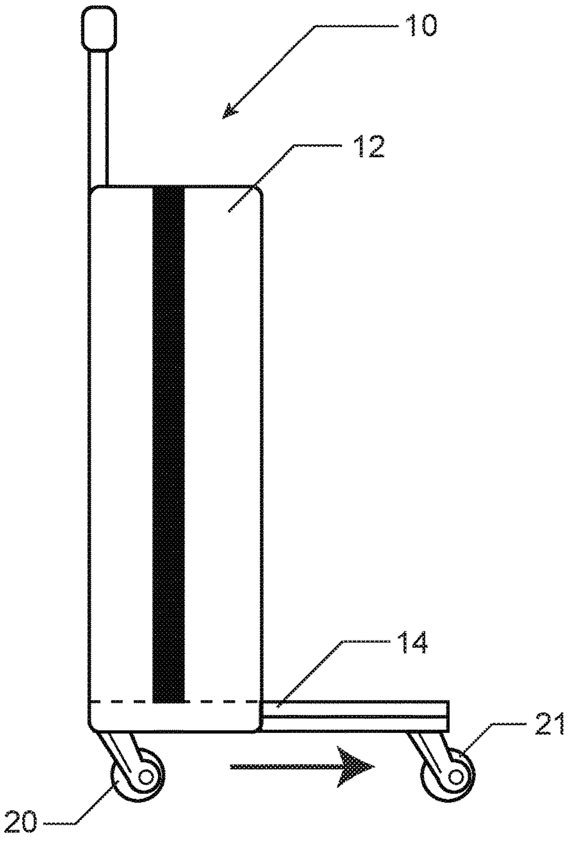
FIG. 2C is a side view of the luggage transport system of FIG. 2A, showing the transport platform being moved to a working configuration.

FIGS. 2A-2D illustrate another exemplary embodiment of the luggage transport system of the present invention. In this embodiment, the transport platform 14 slides under the bottom of the first luggage piece 12 when in a non-working position, instead of being folded up to the luggage wall. When it is desired to use the transport platform 14, it is pulled out from under the luggage 12, as shown in FIG. 2C. The platform has one or more wheels 21 positioned on its bottom side that facilitate sliding of the platform and also distribute the weight of the platform and additional luggage supported therein. The platform 14 is attached to the luggage piece 12 via any suitable mechanism that allows the platform to slide in and out from under the luggage piece 12. For example, the bottom of the luggage 12 may have one or more channels, and the transport platform 14 may have one or more corresponding protrusions or wheels that slide inside the channels. It is understood that any other suitable mechanism may also be used.

Figure 2D:
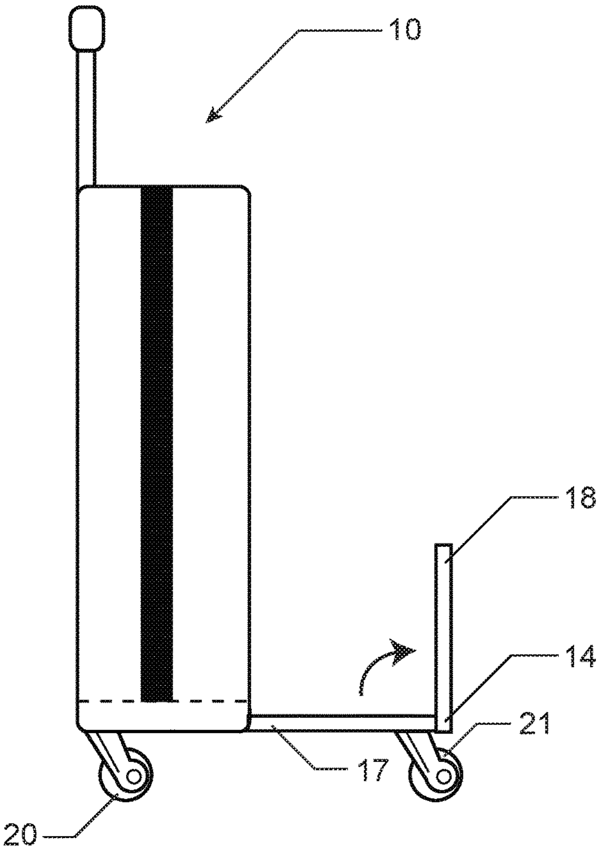
FIG. 2D is a side view of the luggage transport system of FIG. 2A, showing the transport platform in the working configuration.

Once the platform 14 is slid out from under the luggage piece 12, its first portion 17 remains substantially parallel with the bottom of the luggage and its second portion 18 is unfolded such that it extends substantially perpendicular to the first portion 17 and substantially parallel to the luggage wall, as illustrated in FIG. 2D. One or more additional pieces of luggage are then placed on first portion 17 of the platform 14 between the luggage wall and the second portion of the platform 18. As mentioned above, it is understood that the platform may only have the base portion 17 without the unfolding portion 18.

While the transport platform 14 is shown as having wheels 21, it is understood that in some embodiments, such as discussed above with respect to FIGS. 1A-1D, the platform does not have wheels.

Figures 3A, 3B, 3C, 3D:
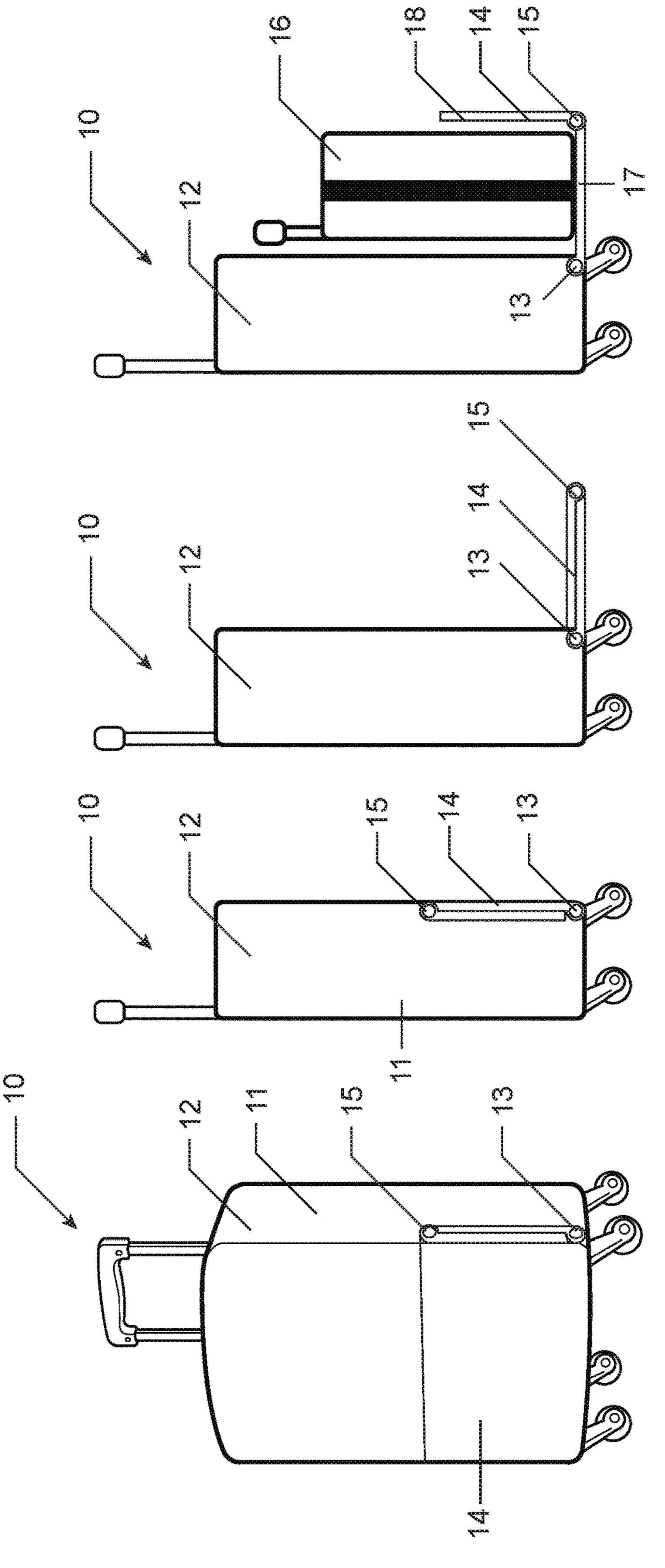
FIG. 3A is a front perspective view of another embodiment of the luggage transport system of the present invention.
FIG. 3B is a side view of the luggage transport system of FIG. 3A, showing a transport platform in a non-working configuration.
FIG. 3C is a side view of the luggage transport system of FIG. 3A, showing the transport platform being moved to a working configuration.
FIG. 3D is a side view of the luggage transport system of FIG. 3A, showing the transport platform in the working configuration.

In the embodiment shown in the previous figures, the transport platform is attached to the front wall of the first piece of luggage. It other embodiments, such as illustrated in FIGS. 3A-3D, the transport platform is attached to the side walls of the luggage. As shown in FIG. 3A, the transport platform 14 is slightly wider than the width of the luggage piece 12 such that the sides of the platform extend to the side walls 11 of the luggage. The sides of the transport platform 14 are attached to the side walls 11 of the luggage 12 adjacent the bottom of the luggage via pivoting members 13.

In order to bring the platform 14 into a working position, it is first pivoted down from its non-working configuration shown in FIG. 3B into a position shown in FIG. 3C by pivoting the platform through the pivoting members 13. In this position, the first part 17 of the platform 14 is substantially perpendicular to the front wall of the luggage 12 and the second part 18 of the platform 14 is substantially parallel to the first part and is resting of the first part. Next, the second part 18 is pivoted up via the pivoting members 15 such that it extends upward substantially perpendicular to the first part 17, as shown in FIG. 3D. Additional piece of luggage 16 can then be placed on the first part 17 of the platform 14 for transport.

Figures 4A, 4B, 4C:
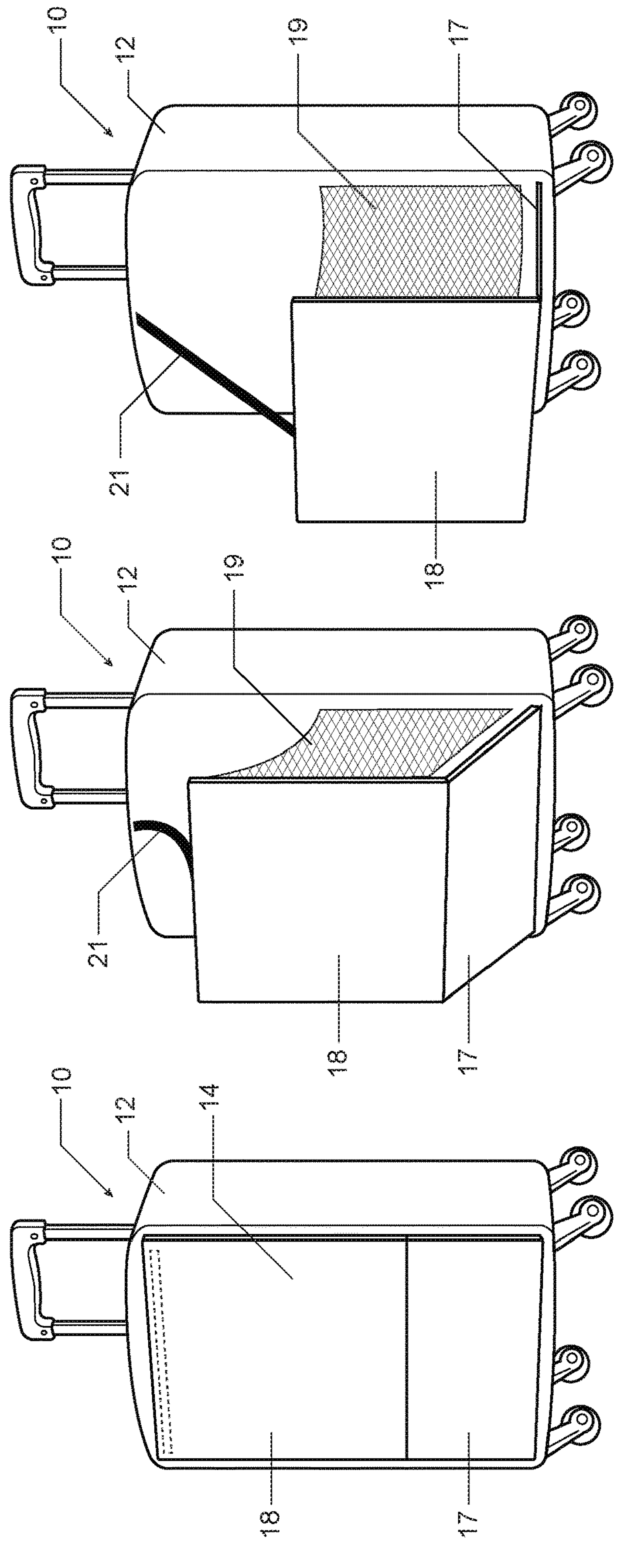
FIG. 4A is a front perspective view of an additional embodiment of the luggage transport system of the present invention, showing a transport platform in a non-working configuration.
FIG. 4B is a front perspective view of the luggage transport system of FIG. 4A, showing the transport platform being moved to a working configuration.
FIG. 4C is a front perspective view of the luggage transport system of FIG. 4A, showing the transport platform in the working configuration.

FIGS. 4A-4C illustrate a further embodiment of the luggage transport system 10 of the present invention. In this embodiment, when the platform 14 is in its non-working position, as shown in FIG. 4A, both the first part 17 and the second part 18 are folded upwards to the wall of the luggage 12. Both parts 17 and 18 extend along the same vertical axis and are both substantially parallel to the wall of the luggage 12. When it is desired to use the platform 14, the first part 17 of the platform is unfolded until it is perpendicular to the luggage wall, while the second part 18 remains in an upright position parallel to the luggage wall, as shown in FIG. 4C.

There are two panels 19 connecting the sides of the second part 18 of the platform 14 and the luggage wall, as seen in FIGS. 4B and 4C. The panels help to retain the additional pieces of luggage on the platform 14 such that they do not slide out during transport and also provide more stability and support to the transport platform. The panels 19 may be made with a mesh material or any other suitable material that is preferably durable and at the same time foldable and light weight. The panels may also be in a form of belts, straps, cover, etc., and may be permanently or removably attached to the luggage and the transport platform.

An additional connecting member 21 may be provided as shown in FIGS. 4B and 4C. The member 21 may be a strap, a panel of suitable material, or a cover connecting a top of the second portion 18 of the platform 14 with the luggage wall. The connecting member 21 may be detachable from one or both ends to facilitate placement of the additional luggage pieces on the transport platform 14, and then is attached for transport. The member 21 further secures additional luggage on the transport platform and provides support and stability to the platform, and additionally safeguards the additional luggage from theft.

The transport platform of the present invention may have one or more wheels attached thereto to facilitate transport of the system and provide additional support for the platform. In the embodiment shown in FIGS. 2A-2D, a pair of wheels is fixedly attached to the bottom wall of the platform.

Alternatively, as shown in FIGS. 5A-5E, a pair of wheels 23 is attached to the transport platform 14 via connectors 19 that allow the wheels 23 to rotate at least 90 degrees. When the platform is in its non-working position shown in FIGS. 5A and 5B, the platform 14 is folded upward to the luggage wall and the pair of wheels 23 are positioned such that they extend to the sides of the luggage 12. This way, the platform and the wheels are their most compact configuration to facilitate storage of the luggage 12, e.g. in airplane overhead compartment.

Figures 5A, 5B, 5C, 5D, 5E:
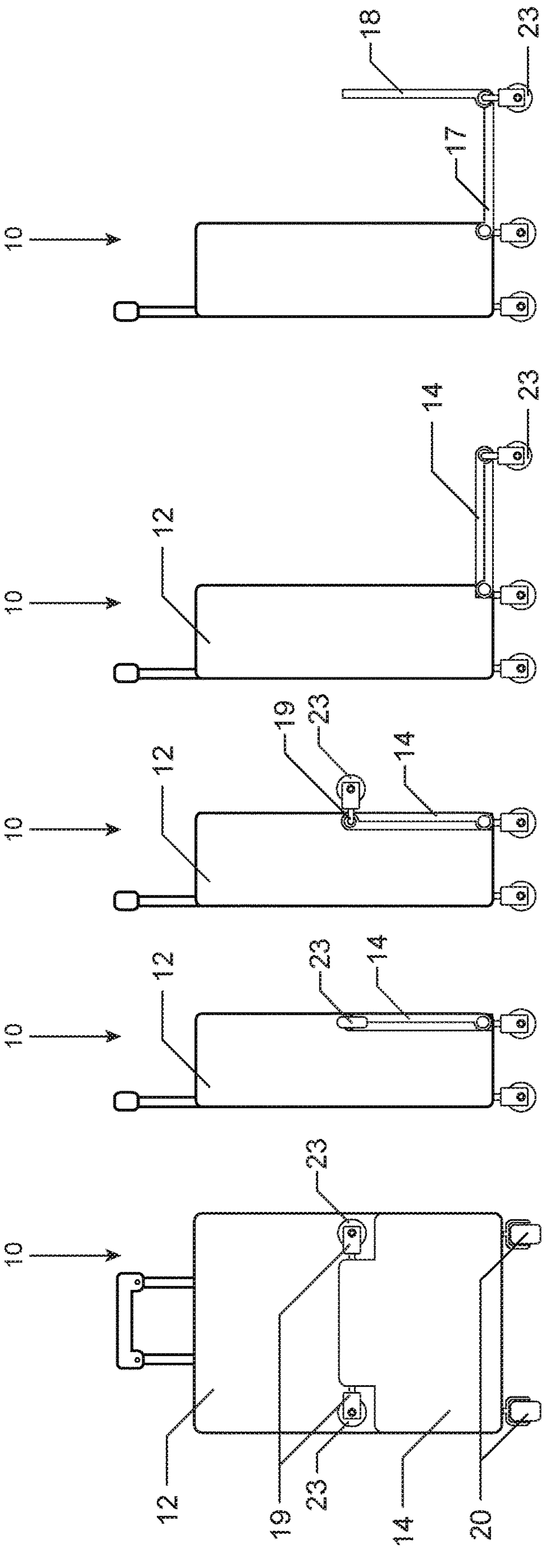
FIG. 5A is a front view of another embodiment of the luggage transport system of the present invention.
FIG. 5B is a side view of the luggage transport system of FIG. 5A, showing a transport platform in a non-working configuration.
FIG. 5C is a side view of the luggage transport system of FIG. 5A, showing the transport platform being moved to a working configuration.
FIG. 5D is a side view of the luggage transport system of FIG. 5A, showing the transport platform being moved to a working configuration.
FIG. 5E is a side view of the luggage transport system of FIG. 5A, showing the transport platform in the working configuration.

When it is desirable to use the platform for transport, the wheels 23 are rotated inward such that they extend perpendicularly from the luggage wall, as shown in FIG. 5C. Next, the first part 17 of the platform 14 is unfolded away from the luggage wall such that it is perpendicular to the wall and is supported by the wheels 23, as seen in FIG. 5D. Then, the second part 18 of the platform 12 is unfolded upward, as seen in FIG. 5E, such that it extends perpendicularly from the first part 17 and additional piece(s) of luggage are placed on the platform 14 for transport.

FIGS. 6A-6D illustrate an alternative embodiment of the transport platform wheels. In this embodiment, the luggage piece has a first pair of fixedly attached wheels 20 and a second pair of movable wheels 25, 27. The first pair of wheels 20 is positioned adjacent the back wall of the luggage 12 and the second pair of wheels 25, 27 is positioned adjacent the front wall of the luggage 12 and adjacent to the transport platform 14. The second pair of wheels 25, 27 are connected to the luggage 12 via rotating members 27 that allow the wheels to rotate around the point of attachment to the luggage 12 in both clockwise and counterclockwise direction.

Figures 6A, 6B, 6C, 6D:
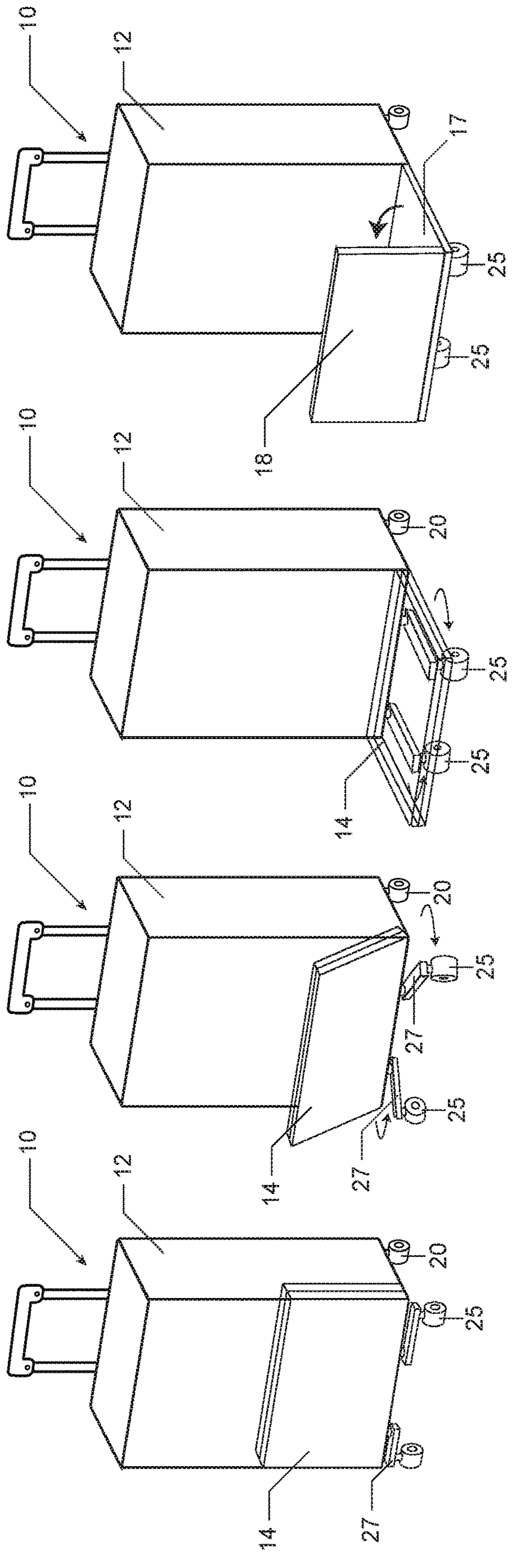
FIG. 6A is a front perspective view of an additional embodiment of the luggage transport system of the present invention, showing a transport platform in a non-working configuration.
FIG. 6B is a front perspective view of the luggage transport system of FIG. 6A, showing the transport platform being moved to a working configuration.
FIG. 6C is a front perspective view of the luggage transport system of FIG. 6A, showing the transport platform being moved to a working configuration.
FIG. 6D is a front perspective view of the luggage transport system of FIG. 6A, showing the transport platform in the working configuration.

When the transport platform 14 is in its non-working configuration shown in FIG. 6A, the wheels 25, 27 are positioned underneath the luggage 12, such that luggage may be wheeled around. Then, when it is desired to use the transport platform 14, the platform is folded down and the wheels 25, 27 are rotated away from the luggage 12, as seen in FIG. 6B, until they are positioned underneath the platform 14, as shown in FIG. 6C. The second part 18 of the platform is then unfolded, as illustrated in FIG. 6D, and additional luggage may be placed on the platform 14.

It is understood that, in alternative embodiments, only one wheel may be provided on the transport platform that has the same actuation mechanisms as described above with respect to FIGS. 5A-5E and 6A-6D. In additional embodiments, more than two wheels may also be provided. In yet further embodiments, the wheel(s) provided on the transport platform are removable such that they can be detached when the platform is not in use.

Figure 7A:
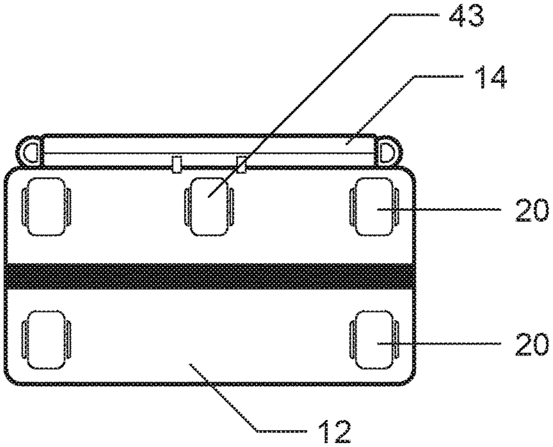
FIGS. 7A-7C are bottom views of the luggage transport system of the present invention, showing the transport platform in various configurations.
Figure 7B:
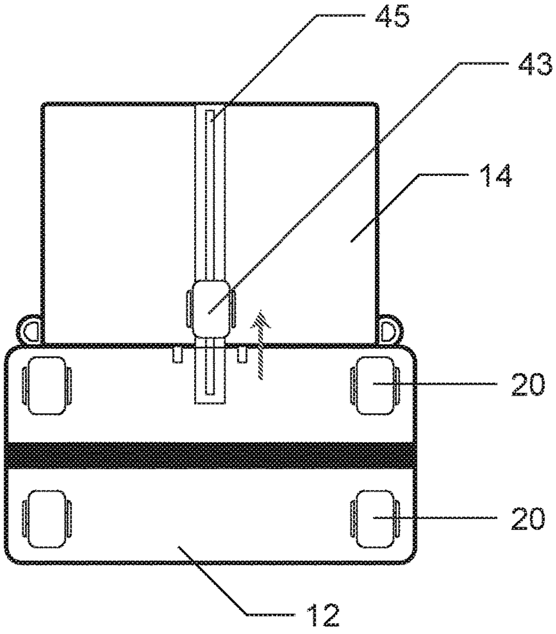
Figure 7C:
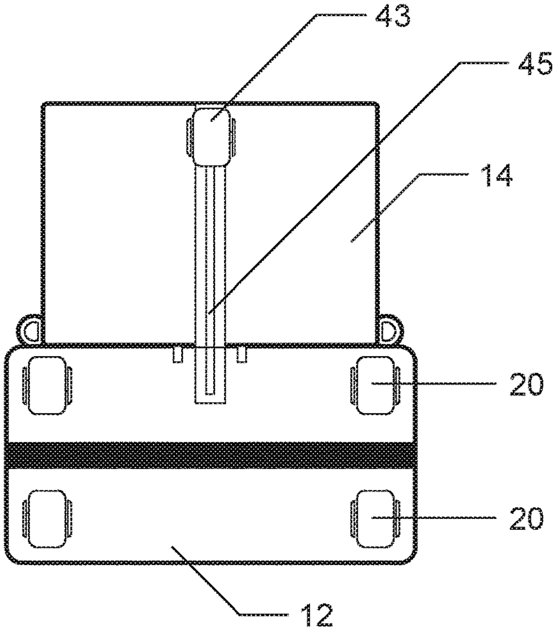
Figures 8A, 8B, 8C:
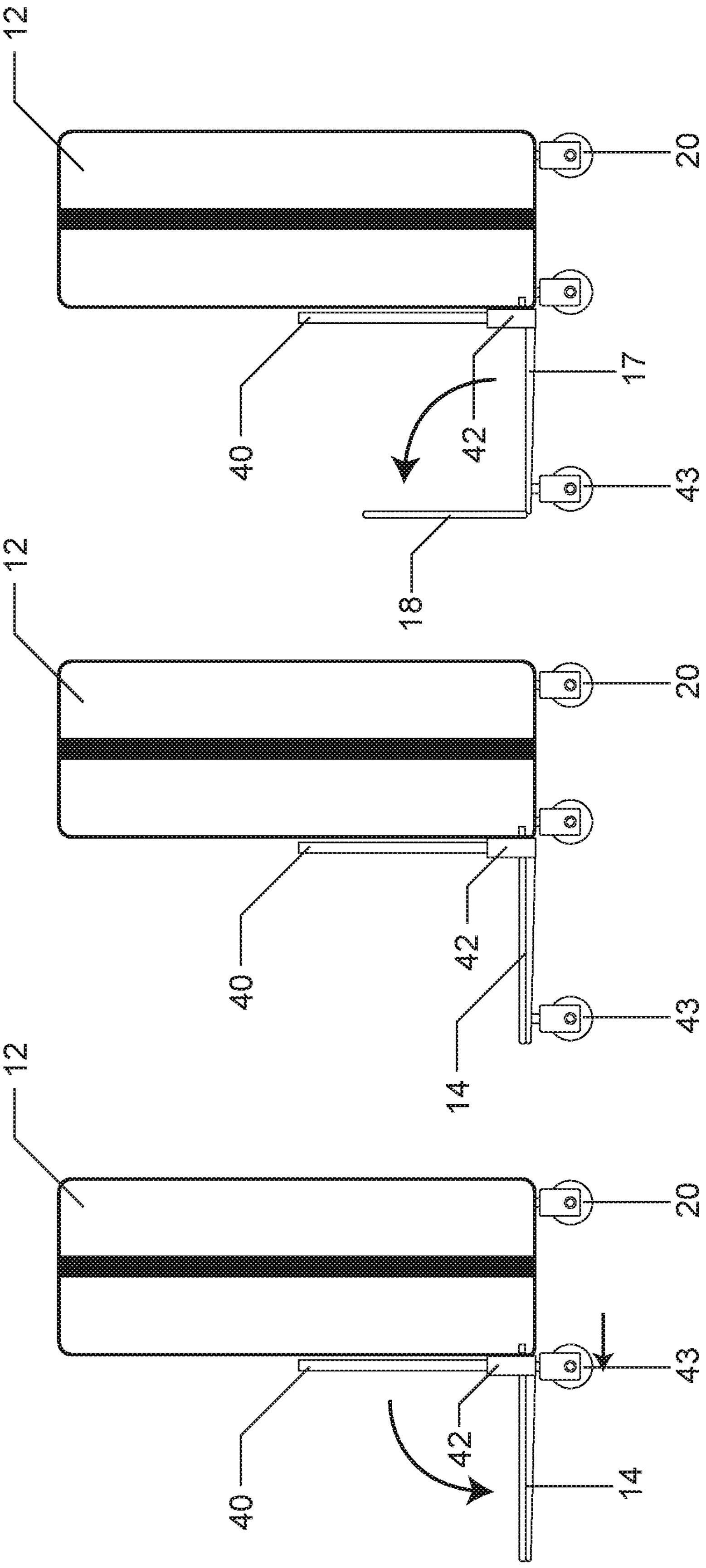
FIGS. 8A-8C are side views of the luggage transport system of FIGS. 7A-7C, showing the transport platform being moved from a non-working configuration to a working configuration.

Yet another alternative embodiment of the wheel arrangement is illustrated in FIGS. 7A-7C and 8A-8C. In this embodiment, the bottom of the luggage piece 12 has four main wheels 20 and an additional movable wheel 43, as shown in FIG. 8A. The bottom side of the transport platform 14 has a channel 45 that slidably accomodates the additional wheel 43, as illustrated in FIG. 8B. Once the platform 14 is folded down to its working configuration, the wheel 43 slides into the channel 45 such that the wheel 43 can be positioned underneath the transport platform 14, as shown in FIG. 8C. This way, the weight of the platform with the additional luggage supported thereon is distributed to the additional wheel 43 making the luggage system more stable and easier to maneuver.

Figure 9A:
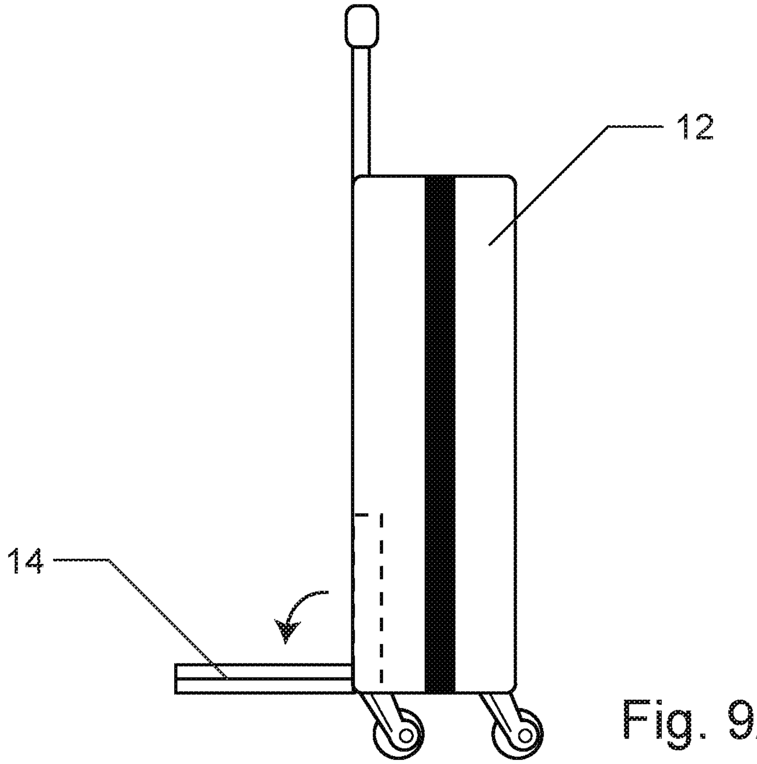
Figure 9B:
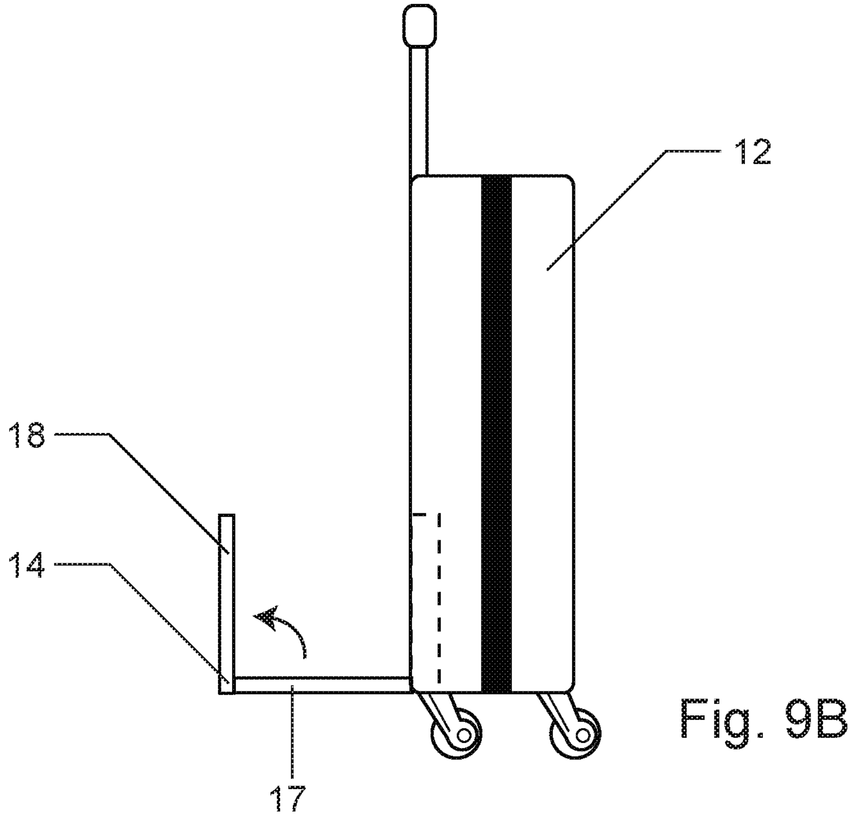

When the transport platform 14 is in its non-working configuration, it is folded upwards to the wall of the luggage piece 12, as shown in FIGS. 7A-7B. When in use, the transport platform 14 is unfolded down, as illustrated in FIG. 9A, such that it is substantially parallel with the bottom of the luggage piece 12. This is made possible by a pivotable connection between the platform 14 and the wall of the luggage 12 that allows the platform to pivot down. Next, the additional wheel 43 is slid along the channel 45 and is positioned underneath the transport platform 14, as shown in FIG. 9B. Then, the second portion 18 of the platform 14 is unfolded such that it is substantially perpendicular to the first portion 17 and substantially parallel to the luggage piece 12, as illustrated in FIG. 9C, and an additional piece of luggage is placed on the platform between the second portion 18 and the luggage piece 12.

In alternative embodiments, one or more additional wheels may be initially placed under the luggage 12. Then, when it is desirable to use the transport platform, the wheels are detached from the bottom wall of the luggage and are attached to the bottom wall of the transport platform. Any suitable attachment mechanism may be used to attach the wheels to the luggage and the transport platform.

Figure 10A:
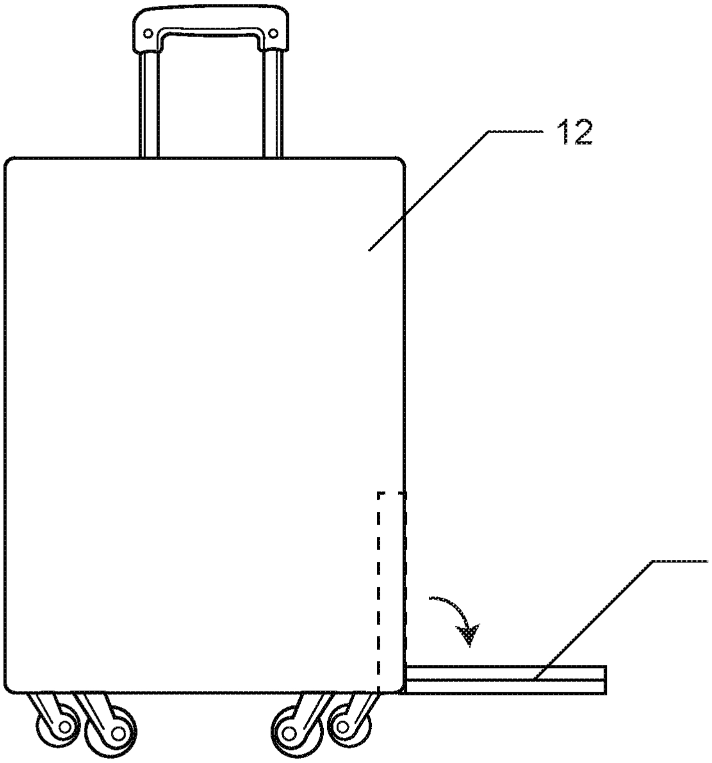
FIGS. 10A and 10B are front views of the luggage transport system of the present invention, with the transport platform attached to a side wall of the luggage piece, showing the transport platform in different configurations.
Figure 10B:
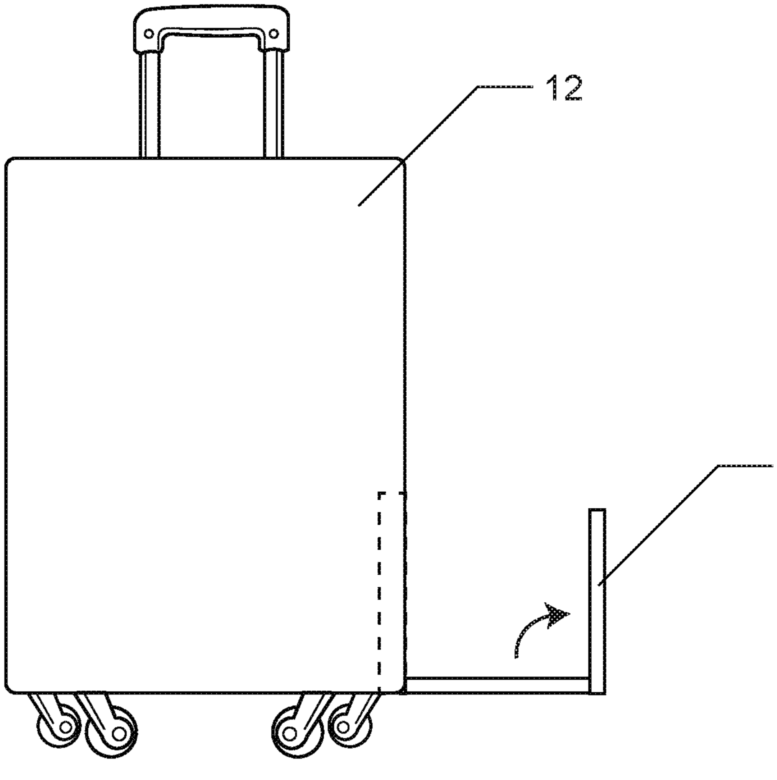

It is important to note that the attachment configurations between the luggage piece 12 and the transport platform 14 described above are only exemplary and that other attachment configurations may also be used. For example, as shown in FIGS. 9A and 9B, the transport platform 14 may be coupled to the rear wall of the luggage piece 12 instead of the front wall. In additional embodiments, the transport platform 14 may be coupled to one of the side walls of the luggage piece 12, as shown in FIGS. 10A and 10B.

Figure 11A:
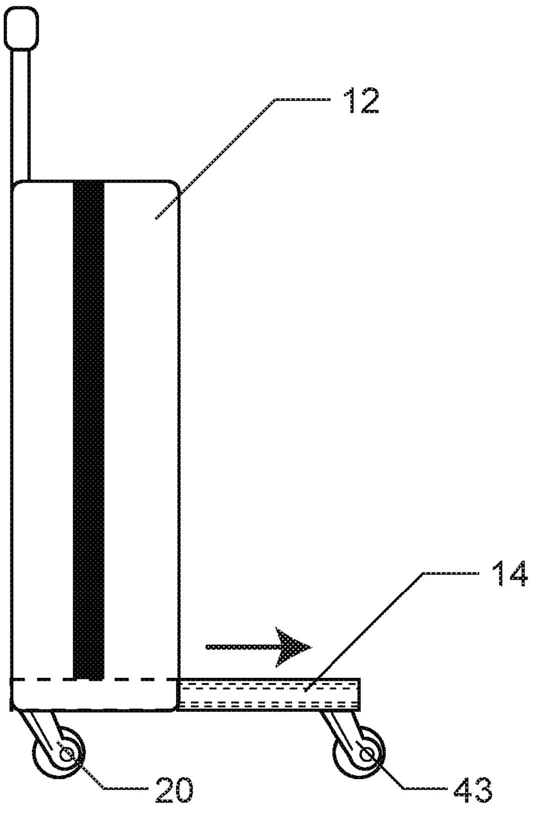
FIGS. 11A and 11B are side views of the luggage transport system of the present invention, showing a telescoping transport platform in different configurations.
Figure 11B:
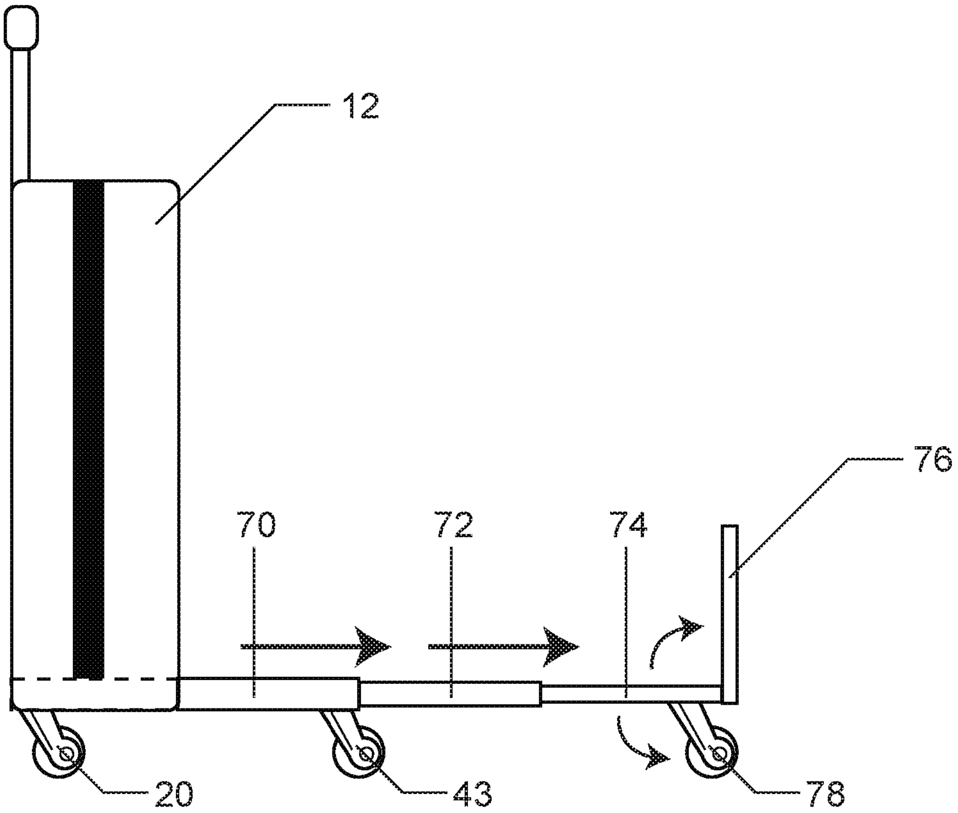

FIGS. 11A and 11B depict yet another configuration of the transport platform 14. In this configuration, the transport platform 14 includes two or more telescoping portions. In the non-working configuration, the platform 14 is slid under the luggage piece 12. Then, as shown in FIG. 11A, a first portion 70 of the platform 14 is pulled out, while other telescoping portions of the platform are positioned inside the first portion 70. Preferably, the first portion 70 has a wheel 43 positioned underneath it to support the weight of the telescoping platform portions and additional pieces of luggage placed thereon. The second and third portions 72, 74 of the transport platform 14 can then be pulled out as needed, as shown in FIG. 11B, to accommodate additional pieces of luggage.

One or both of the second and third telescoping portions 72, 74 may have an additional wheel 78, as seen in FIG. 11B, to further assist in distributing the weight of the entire luggage system. In some embodiments, the wheel 78 may fold into one of the platform portions 72 or 74 when the portions are in the non-working configuration or when the additional wheel is not needed. The telescoping transport platform 14 also has a terminal fold-out portion 76, as described above, that functions to prevent luggage pieces from sliding off the platform.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A luggage transport system, comprising:
- a first piece of luggage having a bottom portion, a front wall, a rear wall, and two side walls; and
- a transport platform coupled to the bottom portion of the first piece of luggage;
- wherein said transport platform comprises a first part and a second part pivotably connected to the first part, wherein said first part has two side edges extending parallel to the side walls of the first piece of luggage;
- wherein the second part is substantially rigid and extends upward from the first part substantially perpendicular to the first part when the transport platform is in a working position; and
- wherein the second part comprises a wall that extends from one side edge to the other side edge of the first part.

2. The luggage transport system of claim 1, wherein the first part of the transport platform is substantially perpendicular to an adjacent wall of the first piece of luggage when the transport platform is in the working position.

3. The luggage transport system of claim 1, wherein the first part and the second part and of the transport platform extend along the same vertical axis when in a non-working position.

4. The luggage transport system of claim 1, wherein the second part of the transport platform is substantially parallel to the first part when the transport platform is in a non-working position.

5. The luggage transport system of claim 1, wherein the transport platform folds upward towards a wall of the first piece of luggage when in a non-working position and folds downward when in the working position.

6. The luggage transport system of claim 5, wherein the transport platform folds to the front wall of the first piece of luggage.

7. The luggage transport system of claim 5, wherein the transport platform folds to the rear wall of the first piece of luggage.

8. The luggage transport system of claim 5, wherein the transport platform folds to one of the sidewalls of the first piece of luggage.

9. The luggage transport system of claim 1, wherein the transport platform slides under the first piece of luggage when in a non-working position and slide from under the first piece of luggage when in the working position.

10. The luggage transport system of claim 1, wherein the first part of the transport platform has a top wall and a bottom wall, and wherein the second part of the transport platform has a top surface and a bottom surface.

11. The luggage transport system of claim 10, wherein, when the transport platform is in a non-working position, the bottom surface of the second part is facing a wall of the first piece of luggage and the top surface of the second part is facing the top wall of the first part.

12. The luggage transport system of claim 10, wherein, when the transport platform is in a non-working position, the top wall of the first part and the top surface of the second part face a wall of the first piece of luggage.

13. A luggage transport system, comprising:
- a first piece of luggage; and
- a transport platform coupled to the first piece of luggage;
- wherein said transport platform comprises a first part and a second part pivotably connected to the first part, wherein the second part is substantially perpendicular to the first part when the transport platform is in a working position; and
- further comprising two connecting members, wherein each of the two connecting members is connected to a wall of the first piece of luggage at one end and to the second part of the transport platform at the other end.

14. The luggage transport system of claim 10, wherein the transport platform includes at least one wheel positioned on the bottom wall of the first part.

15. A luggage transport system, comprising:
- a first piece of luggage; and
- a transport platform coupled to the first piece of luggage;
- wherein said transport platform comprises a first part and a second part pivotably connected to the first part, wherein the second part is substantially perpendicular to the first part when the transport platform is in a working position;
- wherein the first part of the transport platform has a top wall and a bottom wall, and wherein the second part of the transport platform has a top wall and a bottom wall; and
- wherein the transport platform includes at least one wheel movably positioned on the bottom wall of the first part, and wherein the transport platform further includes a channel positioned on the bottom wall of the first part that movably engages the wheel such that the wheel is positioned under the first piece of luggage when the transport platform is in a non-working position and is moved out and positioned under the transport platform when the platform is in the working position.

16. A luggage transport system, comprising:
- a first piece of luggage; and
- a transport platform coupled to the first piece of luggage;
- wherein said transport platform comprises a first part and a second part pivotably connected to the first part, wherein the second part is substantially perpendicular to the first part when the transport platform is in a working position;
- wherein the first part of the transport platform has a top wall and a bottom wall, and wherein the second part of the transport platform has a top wall and a bottom wall; and
- further comprising a pair of movable wheels coupled to a bottom wall of the first piece of luggage, wherein the pair of wheels are rotated and placed under the transport platform when the platform in in the working position.

17. The luggage transport system of claim 1, wherein the first piece of luggage comprises two or more wheels.

18. The luggage transport system of claim 1, wherein the transport platform is adapted for supporting at least one additional piece of luggage when in the working position.

* * * * *